June 19, 1951     E. N. FORSTER     2,557,867
MEANS FOR ROTATING AUTOMOBILE WHEELS
Filed July 9, 1948
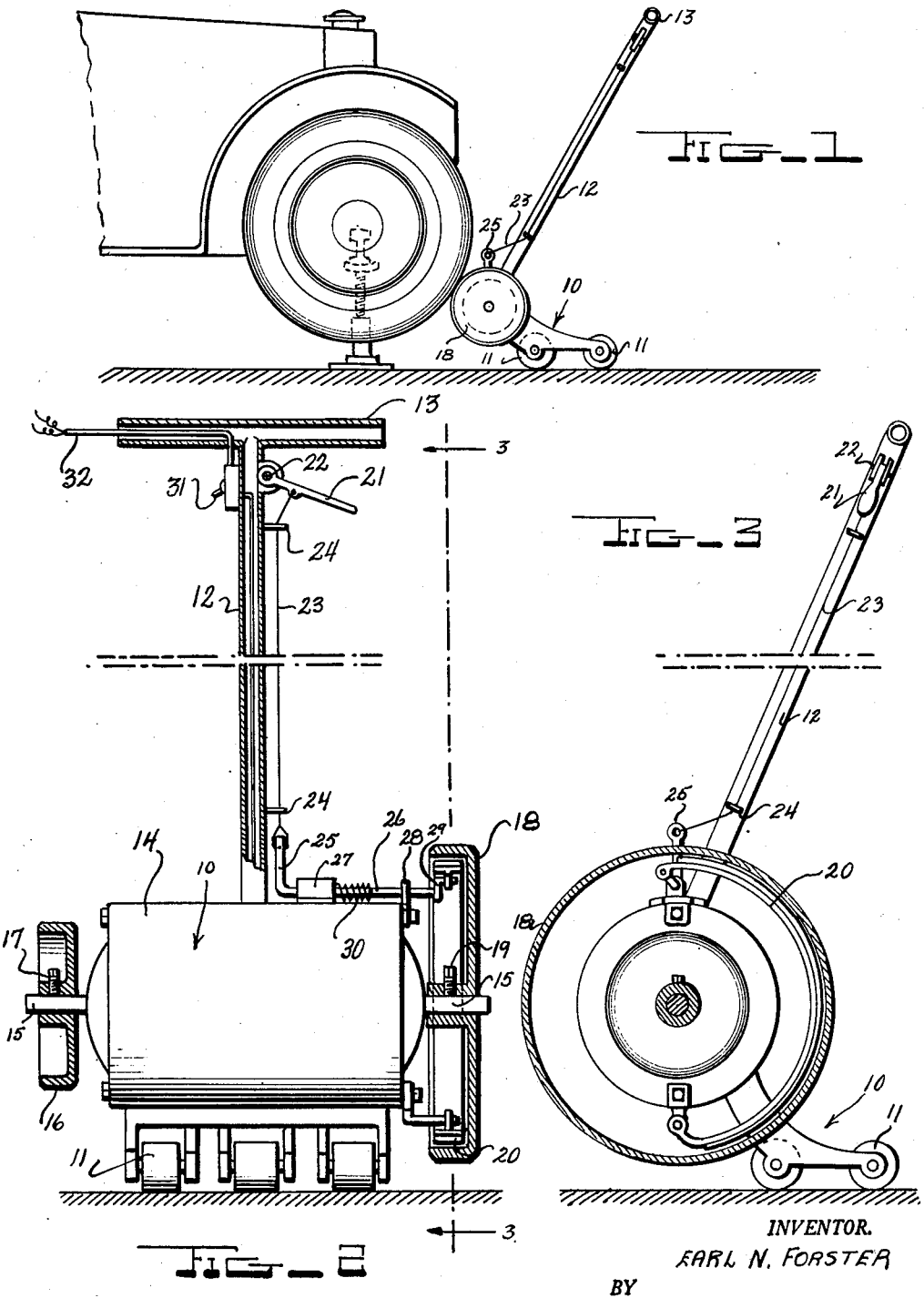
INVENTOR.
EARL N. FORSTER
BY
Jerome W. Paxton
AGENT Patented June 19, 1951

2,557,867

UNITED STATES PATENT OFFICE 2,557,867

MEANS FOR ROTATING AUTOMOBILE WHEELS

Earl N. Forster, Lower Lake, Calif.

Application July 9, 1948, Serial No. 37,830

1 Claim. (Cl. 74—16)

The present invention relates to means for rotating automobile wheels, and more particularly has reference to a highly mobile unit which may be employed to rotate the automobile wheels at various speeds to test the dynamic balance of the wheels.

More specifically, the invention comprises a wheeled chassis having suitably mounted thereon an electric motor, and a pair of disks of different diameter are anchored to the free ends of the shaft. A handle extends upwardly from the chassis and supports the switch mechanism for operating the motor and a braking lever by means of which the rotary movement of the disk of larger diameter may be arrested.

I am, of course, aware that portable units for rotating vehicle wheels for testing the dynamic balance have been used, but the present unit embodies certain novel features which afford a portable unit of greater efficiency than the machines now in use.

An object of the present invention is to provide a portable machine for spinning automobile wheels for testing the dynamic balance of the wheels, wherein the arrangement is such that the initial rotation of the wheel is at a moderate speed and when the wheel has gained sufficient momentum, means are provided for rotating the wheel to the desired higher speed.

Another object of the present invention is to provide a portable highly mobile machine for rotating automobile wheels to test the dynamic balance of such wheels, wherein a manually operated brake is conveniently actuated from the handle of the machine.

And a further object of my invention is to provide a machine of the character described which is simple in constructional detail, highly efficient in operation, and capable of being easily and inexpensively manufactured.

Still another object of my invention is to provide a portable machine for spinning automobile wheels to test the dynamic balance thereof which is provided with a pair of spinning drums of different diameters.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation showing the manner in which my portable machine is employed to spin or rotate the automobile wheel.

Figure 2 is a front view, partly in section, of the portable machine depicted in Figure 1.

Figure 3 is a sectional view taken along the line 3—3 of Fig. 2, looking in the direction of the arrows.

Referring to the drawings, and more particularly to Figure 3, I have shown a chassis 10 having a plurality of casters 11 for enabling the chassis to be moved about easily. A tubular handle 12 is conveniently secured to the chassis and extends upwardly therefrom and terminates in a laterally disposed tubular grip portion 13. An electric motor 14 is supported by the chassis and is provided with the usual shaft 15 which extends beyond the ends of the motor, as shown in Figure 2.

A disk or drum 16 is detachably connected to one end of the shaft 15, as shown at 17, and a second drum 18 of larger diameter than the drum 17 is secured to the opposite end of the shaft, as shown at 19.

A brake assembly 20 of any suitable design is associated with the drum 18, and the band thereof is adapted to engage the internal surface of the flange provided on the drum for arresting rotation of the drum. To operate the brake assembly 20, it will be noted that a lever 21 is pivoted to the tubular handle 12 immediately below the grip 13 as indicated at 22. A flexible connector 23 is attached to the lever 21 and is maintained in substantially parallel relation to the handle 12 by eyes 24. The lower end of the flexible connector 23 is attached to an eye formed adjacent the upper end of an upstanding member 25 of a brake operating rod 26. The brake operating rod 26 is mounted on the upper portion of the motor casing 14 and is maintained in the proper position by guides 27 and 28 suitably secured to the motor casing. The outer end of the rod carries a crank 29 which is operatively connected to the brake assembly 20, and a spring 30 is adapted to maintain the brake assembly normally in the non-braking position, as shown in Figure 2. As perhaps best illustrated in Figure 3, the upstanding member is located at a position forwardly of the tubular handle 12 and manifestly, upon movement of the lever 21 upwardly, the upstanding member 25 will be moved pivotally toward the handle 12 against the action of the spring 30 and thus cause the lining on the brake assembly 20 to engage the flange of the drum 18 and hence arrest rotation of the drum. Obviously, upon release of the handle 12, the spring 30 will return the parts to the position illustrated in Figure 3.

To operate the motor 14, it will be noted that a switch 31 is conveniently mounted on the tubular handle and electrical conducting wires 32 extend through the grip portion 13 to the switch 31 and thence to the electric motor. The free extremity of the conductor 32 may carry a plug (not shown) for insertion into the conventional convenient outlet.

In operation, the wheels of the automobile to be tested are jacked up and the chassis is then moved to a position wherein the drum 16 will engage the outer periphery of the wheel, as shown in Figure 1. The switch 31 is then manipulated to effect rotation of the drum 16 and when the wheel has attained sufficient momentum, the chassis is moved to permit the drum 18 to contact the wheel and rotate the wheel to the higher speeds desired. When the required checking has been accomplished, the drum 18 and also the wheel of the vehicle is stopped by manipulation of the brake assembly 20 through the hand lever 21 and the brake assembly is so constructed that the wheel will be brought to a rapid stop.

As will be understood, the machine assemblage is such as to develop the testing speed of the wheel under stage development conditions, the peripheral speed of the smaller drum 16 being materially less than that of the larger drum 18. Since the mobility of the machine will permit rapid shifting of the machine, the wheel can be brought to an intermediate speed value during cooperative activity of the wheel with drum 16, and while the wheel continues rotation at such speed, the machine is shifted to bring drum 18 into such cooperative relation to raise the wheel speed to the testing speed range. Throughout, the shaft 15, is rotating at constant speed with both drums rotating, the relative locations of the drums preventing concurrent cooperation with the wheel. The advantage of such arrangement lies in the fact that no change in motor speed is required to provide the gradual development of the wheel rotation speed to the desired extent. As a result, the machine requires no special motor control mechanism, such, for instance, as a rheostat or similar type of control, the speed development being produced by the two different peripheral speed values provided by the two drums, thus simplifying the operation and reducing the cost of the machine itself.

It is thought readily apparent from the foregoing that I have provided a portable machine for rotating automobile wheels to test their dynamic balance which possesses few essential working parts and which may be easily operated without the employment of skilled personnel. The switch for controlling the operation of the motor 14 and the brake lever for actuating the brake assembly are conveniently located to the operator of the machine, and the respective members may be quickly and easily operated.

The invention is not to be confined to any strict conformity with the showing in the drawing but may be changed or modified so long as such changes or modifications mark no material departure from the salient features of the invention as expressed in the appended claim.

I claim:

In assemblages for testing the dynamic balance of automotive wheels, wherein the jacked-up wheel is rotated at high speed for testing purposes, a mobile frame carrying a motor and a shaft driven thereby, a pair of individual drums carried at opposite end zones of and rotatable with the shaft, said drums differing in diametrical dimensions, the relative locations of the drums being such that the drums are limited to individual cooperative activity with the wheel being tested, the mobility of the machine permitting either drum to be positioned for cooperative action with the wheel at will to thereby permit initial cooperation with the drum of less diameter to develop intermediate speed values of the wheel and to then render the second drum of larger diameter cooperative to develop the testing speeds, a brake mechanism associated with the drum of larger diameter operative at will to enable rapid speed decrease when the dynamic test has closed, and a handle having a gripping zone on said mobile frame, the said brake mechanism together with the motor operation control mechanism being operated from such gripping zone.

EARL N. FORSTER.

REFERENCES CITED

The following references are of record in the file of this patent:

UNITED STATES PATENTS

| Number | Name | Date |
| --- | --- | --- |
| 1,029,959 | Tideman | June 18, 1912 |
| 1,521,882 | H'Doubler | Jan. 6, 1925 |
| 2,018,160 | Weaver | Oct. 22, 1935 |
| 2,254,786 | Snyder | Oct. 2, 1941 |
| 2,430,629 | Bigus, Jr. | Nov. 11, 1947 |